United States Patent
Kenyon et al.

(10) Patent No.: US 7,751,389 B2
(45) Date of Patent: Jul. 6, 2010

(54) TELECOMMUNICATIONS SYSTEM AND METHOD FOR FORWARDING MESSAGES BASED UPON SUBSCRIBER IDENTIFICATION INFORMATION

(75) Inventors: Brad Kenyon, Omaha, NE (US); Mike Kelly, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 923 days.

(21) Appl. No.: 10/883,343

(22) Filed: Jul. 1, 2004

(65) Prior Publication Data

US 2006/0002400 A1    Jan. 5, 2006

(51) Int. Cl.
    *H04L 12/56* (2006.01)
(52) U.S. Cl. .............. 370/389; 370/352; 455/433; 455/428; 455/435.1
(58) Field of Classification Search ........ 455/433, 455/445, 67.1, 456.1, 414.1, 415, 428, 435; 370/389, 352
    See application file for complete search history.

(56) References Cited

U.S. PATENT DOCUMENTS

| | | | | |
|---|---|---|---|---|
| 5,711,002 A * | 1/1998 | Foti | ............ | 455/433 |
| 5,862,481 A * | 1/1999 | Kulkarni et al. | ............ | 455/432.2 |
| 6,038,451 A * | 3/2000 | Syed et al. | ............ | 455/445 |
| 6,038,456 A * | 3/2000 | Colby et al. | ............ | 455/456.1 |
| 6,064,887 A | 5/2000 | Kallioniemi | | |
| 6,081,705 A * | 6/2000 | Houde et al. | ............ | 455/411 |
| 6,138,017 A * | 10/2000 | Price et al. | ............ | 455/433 |
| 6,240,293 B1 | 5/2001 | Koster | | |
| 6,556,823 B2 * | 4/2003 | Clapton et al. | ............ | 455/432.3 |
| 6,603,968 B2 * | 8/2003 | Anvekar et al. | ............ | 455/433 |
| 6,735,441 B1 * | 5/2004 | Turgeon et al. | ............ | 455/433 |
| 2002/0197991 A1 | 12/2002 | Anvekar et al. | | |

FOREIGN PATENT DOCUMENTS

| | | |
|---|---|---|
| EP | 0817522 A2 | 1/1998 |
| EP | 1432269 | 6/2004 |
| EP | 0923257 B1 | 11/2004 |
| WO | WO 97/07643 | 2/1997 |
| WO | WO-9707644 A1 | 2/1997 |

OTHER PUBLICATIONS

Chinese Examin. Report, Aug. 22, 2008, 2005100822647.
English Translation, Aug. 22, 2008, 2005100822647.
Text of Second Office Action, Translation of Chinese Second Office Action, Jan. 22, 2010, 3 pages.
Translation of the Office Action, Translation of Sweden Office Action, Dec. 16, 2005, 2 pages.

* cited by examiner

*Primary Examiner*—William Trost, IV
*Assistant Examiner*—Emmanuel Maglo

(57) ABSTRACT

A message-forwarding mobility management (e.g. home location register) component includes a forwarding logic component adapted to receive a message and operates to determine whether to process or forward the message from the subscriber or user identification information in the message. The message may be a TCAP message and the forwarding logic component may include a look-up table containing a plurality of records, each record defining a rule of whether to forward or process corresponding received messages. The subscriber or user identification information in the message may one or both of an IMSI identifier and a MSISDN identifier.

22 Claims, 7 Drawing Sheets

| Entry | Translation Query Attributes ||| Translation Data ||||
|---|---|---|---|---|---|---|---|
| | Subscriber ID ||| Forwarding HLR Number ||| Action Indicator | Network Entity |
| | Subscriber ID | Nature of Address | Number Plan | Subscriber ID Value Address | Nature of Address | Number Plan | Address | | |
| 1 | MSISDN | . | . | 1307754. | . | . | . | Process | |
| 2 | MSISDN | . | . | 1402384. | . | . | . | Forward | 14023847204 |
| 3 | MSISDN | . | . | 1402385. | . | . | 14023847201 | Forward | 14023847204 |
| 4 | IMSI | . | . | . | . | . | 14023847201 | Forward | 14023847204 |
| 5 | . | . | . | . | . | . | 14023847207 | Forward | 14023847208 |
| Default | . | . | . | . | . | . | . | Process | |

FIG. 4

TELECOMMUNICATIONS SYSTEM AND METHOD FOR FORWARDING MESSAGES BASED UPON SUBSCRIBER IDENTIFICATION INFORMATION

BACKGROUND OF THE INVENTION

Modern telecommunications networks provide telephone users with a myriad of advanced features in addition to performing their primary function of placing calls between users. Advanced features such as call waiting, caller identification, caller call back, and handling of calls from wireless users are now standard features offered by most telephone service providers. In order to offer such advanced features, the telecommunications networks of a service provider must be configured to support these features.

One type of modern telecommunications network is a Global System for Mobile Communications (GSM) network, where GSM is a digital cellular phone technology utilizing time division multiple access (TDMA) modulation to communicate signals over the network. The concepts and principles discussed herein apply to other types of telecommunications networks as well, such as Universal Mobile Telecommunications System (UMTS) networks. A GSM network is described herein merely by way of example. FIG. 1 is a functional block diagram of a conventional GSM network 100 including a mobile station 102 that is typically a cellular phone and which communicates over a wireless communications channel 104 with a base station subsystem 106. The base station subsystem 106 communicates with mobile stations 102 in the geographical region or "cell" covered by the system 100, and also communicates with a network subsystem 108 to route calls to and from the mobile stations 102 and verify registration and authenticate information of a subscriber using a mobile station.

The network subsystem 108 includes a mobile switching center (MSC) 110 that communicates with the base station subsystem 106 and also routes messages to and from other components in the network subsystem to verify subscriber registration and authentication information and to perform other functions such as location updating of mobile stations 102. The base station subsystem 106 typically communicates through transaction capabilities applications part (TCAP) messages, which are messages formed according to a specific protocol for communication in the network subsystem 108. The network subsystem 108 further includes signal transfer points (STPs) 112, 114 that route the TCAP messages to appropriate points in the network based upon routing information contained in each TCAP message. More specifically, a destination point code (DPC) and a signaling connection control point (SCCP) called party address dictate routing of the TCAP messages between components in the network 100, as will be understood by one skilled in the art. In this way, each STP 112, 114 functions as a network hub and thereby eliminates the need for direct links between components in the network 100. The network subsystem 108 also includes a pair of home location registers (HLRs) 116, 118, each HLR being a database that stores subscriber information such as registration, feature, and authentication data associated with each subscriber. The network subsystem 108 further includes a second MSC 120 in the example embodiment of FIG. 1 which functions in the same way as the MSC 110. Note that the network 100 can include one or more HLRs.

In operation, when a subscriber initiates a call from his or her mobile station 102, a corresponding message is communicated over the wireless communications channel 104 and through the base station subsystem 106 to the MSC 110. In response to this message, the MSC 110 communicates, via the STPs 112, 114, with the appropriate HLR 116, 118 to verify registration and authentication information for the first subscriber. Once this information has been verified, the MSC 110 routes a TCAP message to a second subscriber to thereby connect or place the call. The MSC 110 determines proper routing of this TCAP message from a dialed number contained in the initial message from the mobile station 102 which is communicated via the communications channel 104 and subsystem 106 to the MSC. The HLRs 116, 118 are the databases within the network subsystem 108 that store all subscriber information and operate in combination with the MSCs 110, 120 as threshold components in granting or denying mobile phone subscribers access to the network subsystem 108.

A number of wireless carriers or service providers typically utilize the network 100 to provide mobile telephone service to their respective subscribers. Each service provider must implement and maintain an HLR 116, 118 to provide service to their subscribers. In many situations, a wireless service provider hires a third party company to provide and maintain the HLR 116, 118 for the provider. The third party company initially establishes the HLR 116, 118 and thereafter maintains the HLR as subscribers are added and removed and the features of each subscriber are changed. Service providers may at some point wish to retain a new company to maintain the HLR 116, 118, and in this situation the subscriber entries in the current HLR must be transferred to a new HLR being established and maintained by the new company. Another situation in which the need to transfer subscriber entries from a first HLR 116, 118 to a second HLR arises when a service provider is expanding and wants to redistribute subscribers to a different HLR within the network subsystem 108.

Typically, to transfer an HLR 116, 118 from an old company to a new company, routing configuration information in the network subsystem 108 must be reconfigured to route calls directed to the old HLR to the new HLR. This approach is very labor intensive and thus timely and expensive to implement. Another approach is to simply transfer all subscriber entries from the old company's HLR 116, 118 to the new company's HLR. This approach is not always possible or practical given that HLRs 116, 118 may contain millions of subscriber entries and thus the delay and expense for transferring all these entries is not practical. Moreover, in this approach the new HLR 116, 118 may not be utilized until all subscriber entries have been transferred, delaying implementation of the new HLR. Thus, until the transfer of all subscriber service to the new HLR 116, 118 is completed the old HLR must be used, or, alternatively, service for the underlying subscribers must be suspended during completion of the subscriber service transfer to the new HLR.

There is a need for a system and method that allows a service provider to more easily transfer subscriber data from one HLR to another and which enables service to be maintained by a service provider during such transfers.

SUMMARY OF THE INVENTION

According to one aspect of the present invention, a message-forwarding home location register component includes a forwarding logic component adapted to receive a message and operates to determine whether to process or forward the message from the subscriber identification information in the message. The message may be a TCAP message and the forwarding logic component may include a look-up table containing a plurality of records, each record defining a rule of whether to forward or process corresponding received messages. The subscriber identification information in the message may be at least one of an IMSI identifier and a MSISDN identifier.

BRIEF DESCRIPTION OF THE DRAWINGS

FIG. 4 is a table illustrating the translation look-up table utilized by the message-forwarding HLR of FIG. 2 according to one embodiment of the present invention.

DETAILED DESCRIPTION OF PREFERRED EMBODIMENTS

Figure 2:
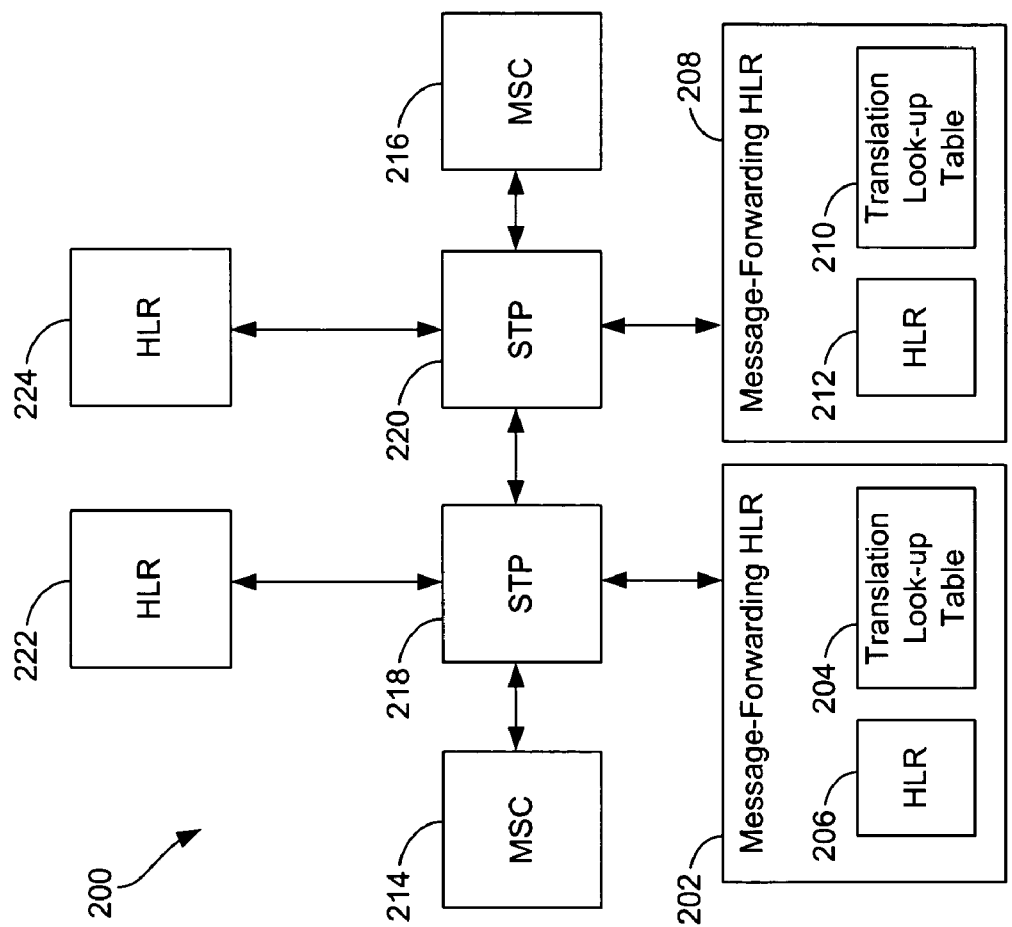
FIG. 2 is a functional block diagram of a GSM network subsystem including a message forwarding home location register (HLR) for forwarding messages based upon subscriber identification contained in each message according to one embodiment of the present invention.

FIG. 2 is a functional block diagram of a GSM network subsystem 200 including a message-forwarding home location register (HLR) 202 that determines whether to forward or process received messages based upon subscriber identification information contained in each message according to one embodiment of the present invention. In making this determination, the message-forwarding HLR 202 compares subscriber identification information in the message to entries in a translation look-up table 204. The entries in the look-up table 204 indicate for specified values of subscriber identification information whether the message-forwarding HLR 202 will process the message as would a conventional HLR or whether the message-forwarding HLR will forward the message. When the look-up table 204 indicates the message is to be processed, the message is provided to an HLR component 206 in the message-forwarding HLR 202 and processed. In contrast, when the look-up table 204 indicates the message is to be forwarded the message-forwarding HLR 202 forwards the message to another HLR as indicated in the look-up table. The message-forwarding HLR 202 allows a service provider to more easily implement a new HLR component 206 by forwarding messages to an old HLR for subscribers that are not yet activated in the new HLR component. In this way, while subscribers are being added to the HLR component 206 the service to all subscribers is maintained. As subscribers are activated in the HLR component 206, the look-up table 204 is updated to thereby redirect messages directed to these newly activated subscribers from the old HLR to the HLR component.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention.

The network subsystem 200, as shown in FIG. 2, includes a second message-forwarding HLR 208 including a corresponding translation look-up table 210 and HLR component 212 that operate in the same way as the corresponding components in the message-forwarding HLR 202. The second message-forwarding HLR 208 allows entries to be shared between look-up tables 204, 210 while limiting certain forwarding rules defined by the entries to a particular one of the message-forwarding HLRs 208 or 202. In alternative embodiments, the network 200 includes additional message-forwarding HLRs or a single message-forwarding HLR. Additionally, the network subsystem 200 includes mobile switching centers (MSCs) 214, 216, signal transfer points (STPs) 218, 220, and conventional HLRs 222, 224 that operate in the same way as the corresponding components previously described with reference to FIG. 1.

In operation, when a subscriber initiates a call, a corresponding TCAP message is received by the MSC 214 which, in turn, routes this message through the STP 218 to the message-forwarding HLR 202. Note that although TCAP messages based upon calls are being described, the operation of the message-forwarding HLRs 202, 208 applies to any type of subscriber-based TCAP message being communicated in the network 200. In response to receiving the TCAP message, the message-forwarding HLR 202 determines whether the message should be processed by the HLR component 206 or be forwarded to one of the conventional HLRs 222, 224. When the message is applied to the HLR component 206, the component processes the message to verify the registration and authentication information of the subscriber information contained in the message. If the message-forwarding HLR 202 determines the TCAP message should be forwarded, the message is routed through the required components to either the HLR 222 or 224. For example, when the message-forwarding HLR 202 determines the TCAP message should be forwarded to the HLR 224, the message-forwarding HLR routes the message to the STP 218 and the message is thereafter routed through STP 220 to the HLR 224. Once either the HLR component 206 or the HLR 224 has verified the information in the received TCAP message, this verification, along with any associated information, is communicated to the MSC 214. The MSC 214 thereafter routes a TCAP message to a second subscriber to connect or "place" the call.

Figure 1:
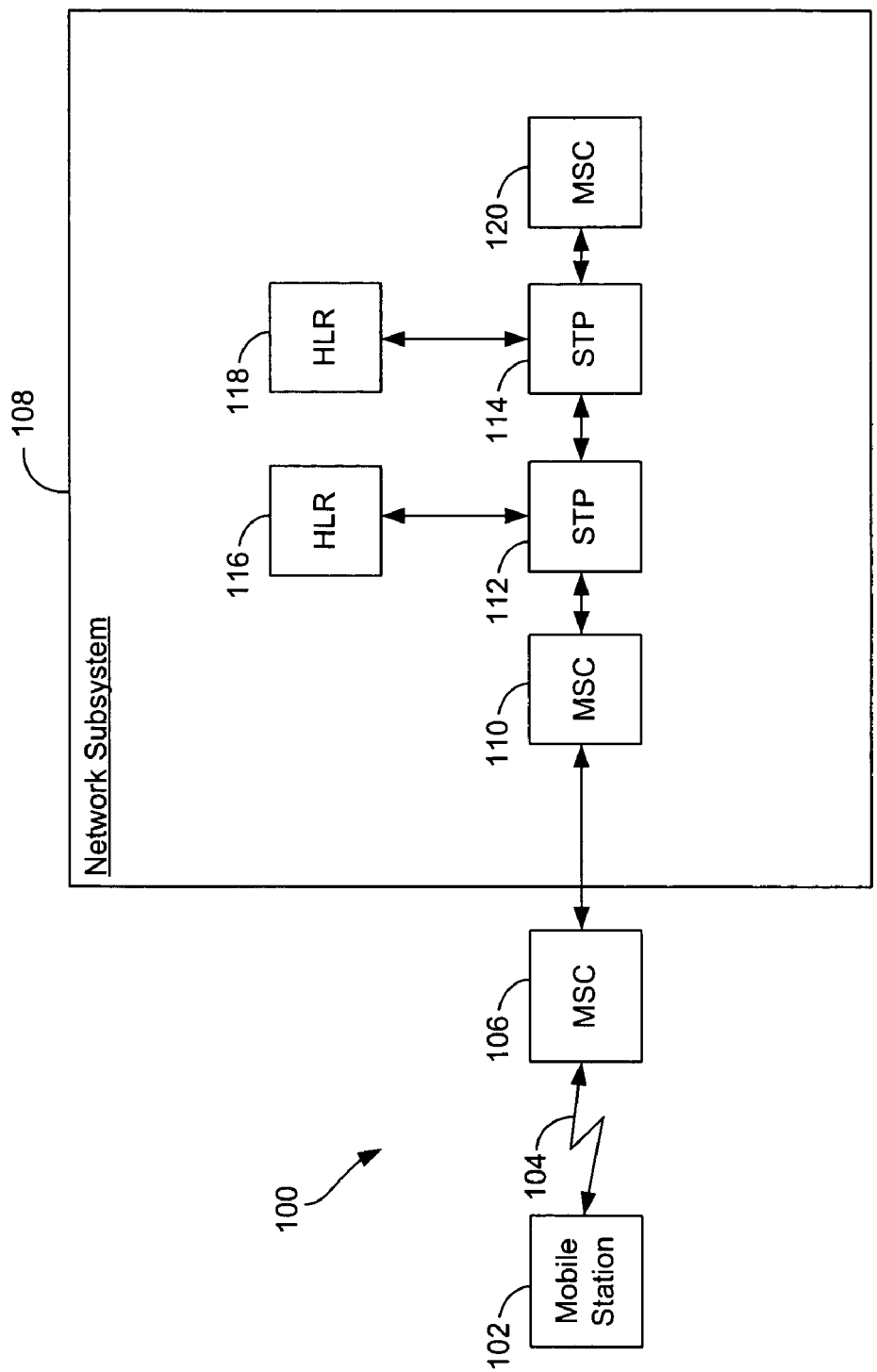
FIG. 1 is a functional block diagram of a conventional GSM network.
Figure 3A:
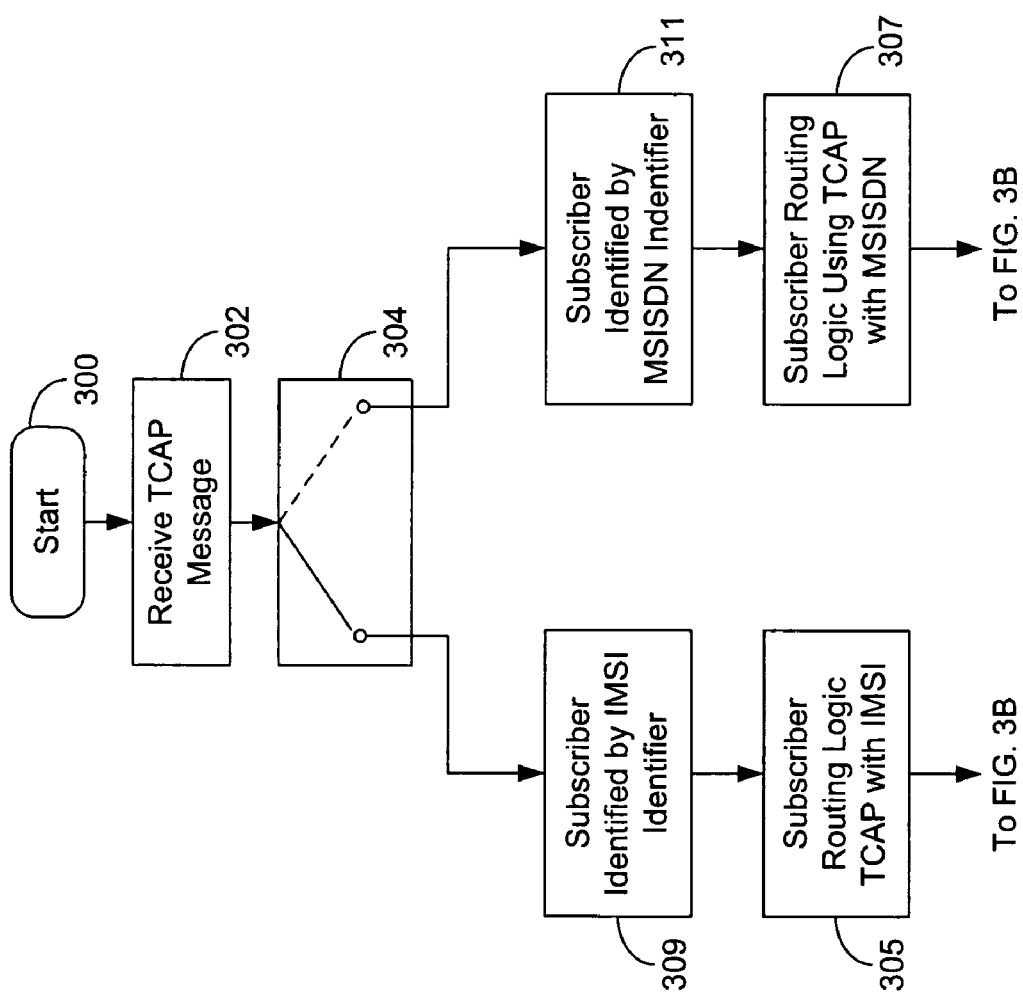
FIGS. 3A and 3B are a flow chart illustrating a message forwarding process executed by the message-forwarding HLR of FIG. 2 according to one embodiment of the present invention.
Figure 3B:
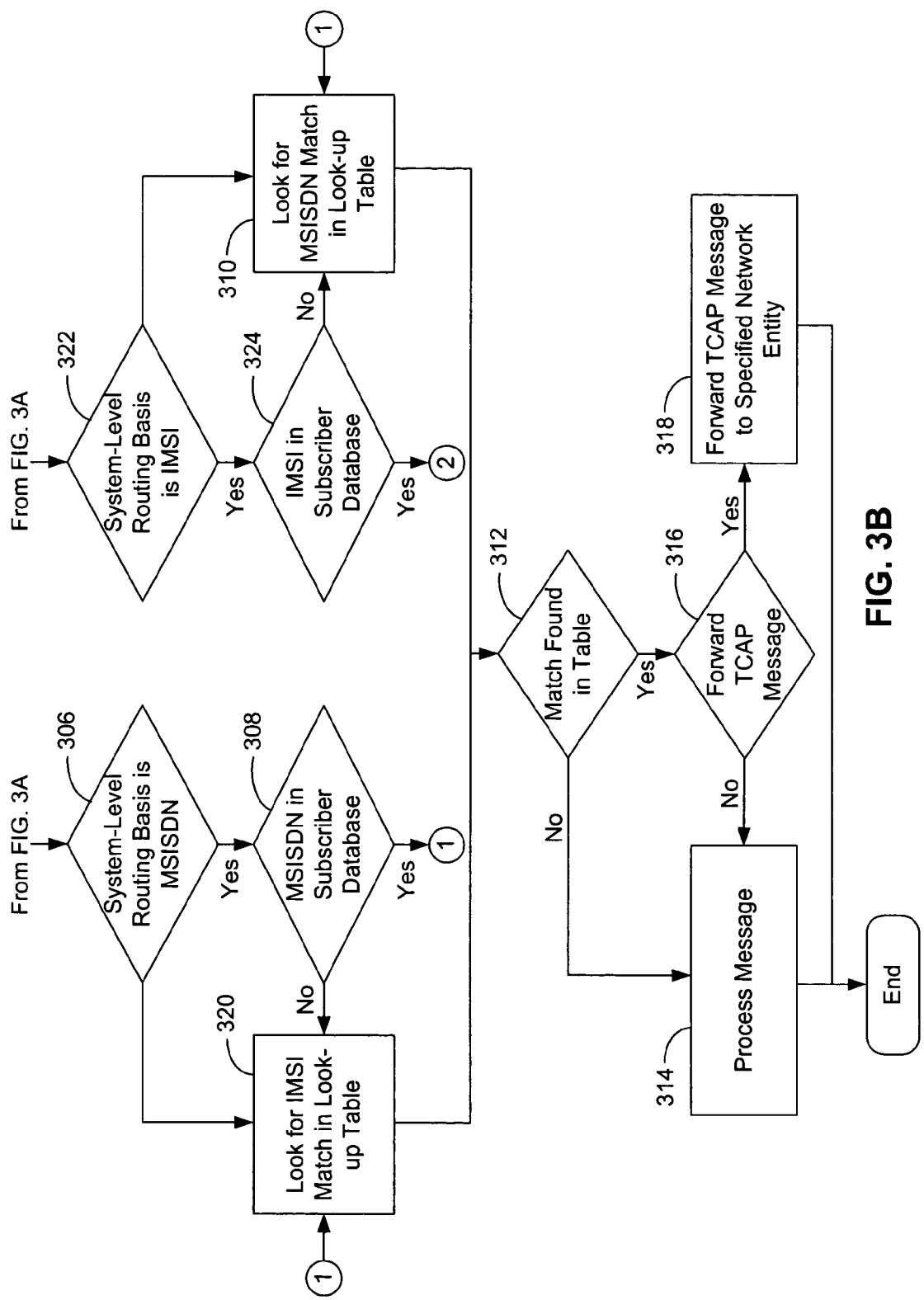

FIGS. 3A and 3B are a flow chart illustrating in more detail a message-forwarding process executed by the message-forwarding HLR 202 of FIG. 2 according to one embodiment of the present invention. Before explaining the process of FIG. 3, a more detailed description of the subscriber identification information contained in a TCAP message is provided. A TCAP message in the GSM network subsystem 200 includes two types of identifiers that are utilized by the message-forwarding HLR 202: 1) an International Mobile Subscriber Identity (IMSI) identifier; and 2) a Mobile Subscriber Integrated Services Digital Network Number (MSISDN) identifier. The IMSI identifier is a unique identifier stored in a Subscriber Identity Module (SIM) contained in a mobile station 102 (FIG. 1). The SIM is a portable card containing other subscriber-specific information along with security data that allows a subscriber to access the network subsystem 200 via different mobile stations simply by plugging the SIM into the mobile station, as will be understood by those skilled in the art. The (MSISDN) identifier corresponds to a telephone number of a subscriber, with each MSISDN being associated with a particular IMSI identifier. When the network 200 is a UMTS network, an IMSI value is stored in a Universal Subscriber Identity Module (USIM) application executing on a Universal Integrated Circuit Chip (UICC) within a mobile station, as will be appreciated by one skilled in the art.

The message-forwarding process of FIG. 3 begins in step 300 and goes to step 302 in which a TCAP message is received. The process then proceeds to step 304, which functionally represents routing or switching of the received message as a function of the type of identifier contained in the message. When a subscriber is identified by an IMSI identifier in the TCAP message, the process goes to step 309 and when the subscriber is identified by an MSISDN identifier the process goes to step 311. Steps 309 and 311 merely indicate the subscriber routing logic to be applied to the message, namely either subscriber routing logic for a TCAP message including a subscriber identified by an IMSI identifier for step 309 or subscriber routing logic for a subscriber identified by an MSISDN identifier for step 311.

From step 309, the process goes to step 306 and determines the value, namely IMSI identifier or MSISDN identifier, to be used in searching the routing translation table in the HLR component 206. When the determination in step 306 is positive, the process goes to step 308 and reads a subscriber record which, if found, will include an MSISDN identifier associated with the received IMSI identifier. If such a record is found the determination in step 308 is positive and the process gores to step 310. In step 310 the process looks for a matching MSISDN identifier in the translation look-up table 204 (FIG. 2).

From step 310 the process goes to step 312 and determines whether the look-up table 204 contains a record corresponding to the search criteria derived from the IMSI identifier in the received message. A few factors may be involved here, such as, for example, routing basis or existence of a subscriber record in regard to the search criteria used in the subscriber routing translation table lookup. Step 312 verifies that a search of the look-up table 204 returned an entry, regardless of whether the entry is based upon an MSISDN or IMSI identifier. If this determination is negative, the process goes to step 314 and the HLR component 206 in the message-forwarding HLR 202 processes the message. In this situation, the subscriber routing translation look-up table does not contain an entry matching the search criteria. Note that the logic of the process of FIG. 3 prevents this situation from ever occurring and thus the determination in step 312 effectively determines whether the translation table look-up returned a table entry. When the determination in step 312 is positive this indicates that there is a record in the look-up table 204 matching the search criteria that is associated with the IMSI identifier in the received message. In this situation, the process goes to step 316 and determines from the record in the look-up table 204 whether the received message is to be forwarded or processed. If the record indicates the message should be processed by the HLR component 206, the determination in step 316 is negative and the process goes to step 314 and the HLR component processes the message. When the record in the look-up table 204 indicates the message should be forwarded, the record also includes a forwarding address to which the message should be forwarded. In this case the process goes to step 318 and the message is forwarded to the indicated forwarding address, which would typically correspond to the old HLR. For example, in the subsystem 200 the forwarding address would typically correspond to an address of the conventional HLR 222 or 224.

When the determination in step 308 is negative this means that the IMSI identifier in the received message is not contained in the HLR component 206 and the process goes to step 320 and determines whether a match in the look-up table 204 was found for the IMSI identifier. The process then goes to step 312 and determines whether the translation look-up table 204 returned an entry in step 320. If the determination in step 312 is negative, no record was found and the process goes to step 314 and the HLR component 206 processes the message. The determination in step 312 is positive if the look-up operation performed in step 320 returned a table entry. If step 320 returns an entry, then the look-up table 204 includes an entry containing the IMSI identifier and the determination in step 312 is positive. The process then goes to step 316 and determines whether the record indicates the message should be forwarded or processed. If the record indicates the message should be processed, the determination in step 316 is negative and the process goes to step 314 and the HLR component 206 processes the message. Conversely, if the record indicates the message is to be forwarded, the process goes to step 318 and forwards the message to a forwarding address contained in the record.

Returning now to step 311, this step merely indicates the subscriber routing logic to be applied for a subscriber identified by an MSISDN identifier for step 311. From step 311, the process goes to step 322 and determines the value, namely IMSI identifier or MSISDN identifier, to be used in searching the routing translation table in the HLR component 206. When the determination in step 322 is positive, the process goes to step 324 and reads a subscriber record which, if found, will include an IMSI identifier associated with the received MSISDN identifier. If such a record is found the determination in step 324 is positive and the process goes to step 320. In step 320 the process looks for a matching IMSI identifier in the translation look-up table 204 (FIG. 2).

From step 320 the process goes to step 312 and determines whether the look-up table 204 contains a record corresponding to the search criteria derived from the MSISDN identifier in the received message. Step 312 verifies that a search of the look-up table 204 returned an entry, regardless of whether the entry is based upon an MSISDN or IMSI identifier. If this determination is negative, the process goes to step 314 and the HLR component 206 in the message-forwarding HLR 202 processes the message. In this situation, the subscriber routing translation look-up table does not contain an entry matching the search criteria. Note that the logic of the process of FIG. 3 prevents this situation from ever occurring and thus the determination in step 312 effectively determines whether the translation table look-up returned a table entry. When the determination in step 312 is positive this indicates that there is a record in the look-up table 204 matching the search criteria that is associated with the IMSI identifier in the received message. In this situation, the process goes to step 316 and determines from the record in the look-up table 204 whether the received message is to be forwarded or processed. If the record indicates the message should be processed by the HLR component 206, the determination in step 316 is negative and the process goes to step 314 and the HLR component processes the message. When the record in the look-up table 204 indicates the message should be forwarded, the record also includes a forwarding address to which the message should be forwarded. In this case the process goes to step 318 and the message is forwarded to the indicated forwarding address, which would typically correspond to the old HLR. For example, in the subsystem 200 the forwarding address would typically correspond to an address of the conventional HLR 222 or 224.

When the determination in step 324 is negative this means that the MSIDSN identifier in the received message is not contained in the HLR component 206 and the process goes to step 310 and determines whether a match in the look-up table 204 was found for the MSIDSN identifier. The process then goes to step 312 and determines whether the translation look-up table 204 returned an entry in step 320. If the determination in step 312 is negative, no record was found and the process goes to step 314 and the HLR component 206 processes the message. The determination in step 312 is positive if the look-up operation performed in step 320 returned a table entry. If step 310 returns an entry, then the look-up table 204 includes an entry containing the IMSI identifier and the determination in step 312 is positive. The process then goes to step 316 and determines whether the record indicates the message should be forwarded or processed. If the record indicates the message should be processed, the determination in step 316 is negative and the process goes to step 314 and the HLR component 206 processes the message. Conversely, if the record indicates the message is to be forwarded, the process goes to step 318 and forwards the message to a forwarding address contained in the record. FIG. 4 is a table illustrating the translation look-up table 204 of FIG. 2 according to one embodiment of the present invention. The look-up table 204 includes a number of records R1-R6, each record including a plurality of fields contained in respective columns in the look-up table. The first field in each record R1-R6 is an "Entry" field, where the records R1-R5 have entry numbers corresponding to the record number. The record R6 contains a default record entry defining the record R6 as a default record in the look-up table. In the present description, these records R1-R6 may alternatively be referred to as records or look-up table entries. The "entry" fields for each record R1-R6 are used for reference purposes only when depicting the table 204 as in FIG. 4 and do not affect forwarding or processing determinations made for received TCAP messages.

The next column in the look-up table 204 or field in each record R1-R6 is a "Subscriber ID" field. In the example of FIG. 4, the records R1-R3 contain MSISDN in their respective Subscriber ID fields, record R4 contains IMSI in its Subscriber ID field, and records R5 and R6 contain a "." which is a wild card character meaning the subscriber identifications of these records can have any values. The next two fields in each record R1-R6 are designated the "Nature of Address" and "Number Plan Fields," and have wild-card characters for all records R1-R6 indicating these fields can have any values. The next field in each record R1-R6 is an "Address" field indicating a specific address or range of addresses for the corresponding Subscriber ID field in the record. For example, the record R1 corresponds to any received message having an MSISDN identifier having a value starting with the numbers "1307754" since the Address field contains the entry "1307754." The wild-card character in this entry indicates the value 1307754 followed by any values. A title "Subscriber ID Value" above the fields Nature of Address, Number Plan, and Address indicates that each of these fields specifies particular parameters for the corresponding Subscriber ID field in each record R1-R6.

The next three fields in each record R1-R6 are also designated "Nature of Address," "Number Plan," and "Address," but these fields specify particular parameters for the message-forwarding HLR 202 (FIG. 2) for which a particular rule defined by a given record R1-R6 applies. A title "Forwarding HLR Number" above these three fields indicates this in FIG. 4. For example, the record R3 corresponds to any received message having an MISIDN identifier with a value in the range "1402385." and forwarded from a message-forwarding HLR 202 having an address of 14023847201.

The final two fields are designated "Action Indicator" and "Network Entity" and collectively define "Translation Data" as indicated by the title above these fields. The Action Indicator field has either a "Forward" or "Process" value and indicates whether the message is to be forwarded or processed. The Network Entity field indicates the address to which the received message is to be forwarded if the Action Indicator field has a "Forward" value. For example, the record R1 defines a rule applied to received messages as follows. If a received message is associated with an MSISDN identifier with a value in the range "1307754.", the message is to be processed by the message-forwarding HLR 202 containing the look-up table 204. The record R2, in contrast, defines a rule that received messages associated with an MSISDN identifier in the range "1402384." are to be forwarded to the address "14023847204." Other embodiments of the look-up table 204 are within the scope of the present invention, with the embodiment of FIG. 4 being presented merely by way of example. Moreover, other embodiments of the message-forwarding HLR 202 may not include a look-up table but instead includes forwarding logic in other forms that determines whether to process or forward a given message.

Figure 5:
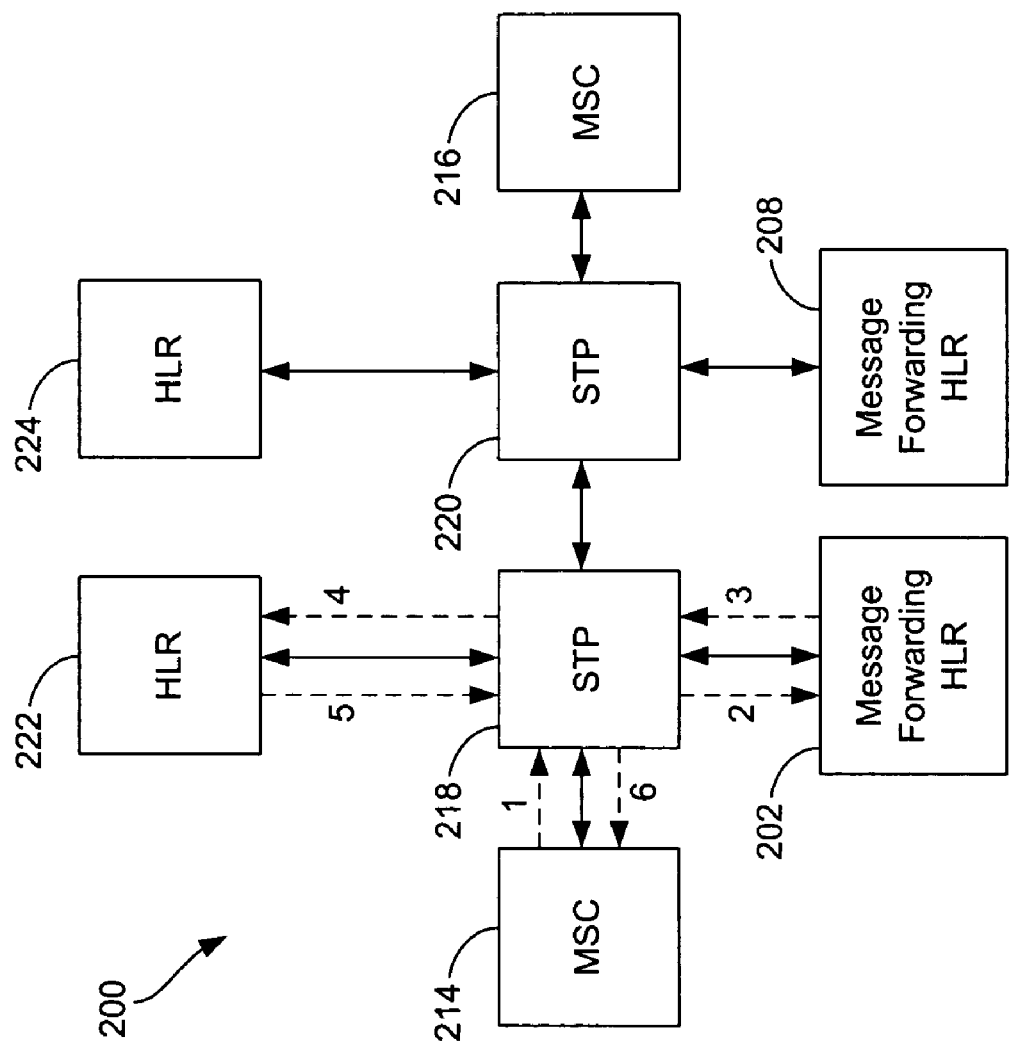
FIG. 5 is a functional block diagram of the network subsystem of FIG. 2 illustrating the routing of messages in the subsystem when the message-forwarding HLR forwards a received message to the appropriate conventional HLR in the subsystem.

FIG. 5 is a functional block diagram of the network subsystem 200 of FIG. 2 illustrating the routing of TCAP messages in the subsystem when the message-forwarding HLR 202 forwards a received message to the appropriate conventional HLR 222. The dotted lines between components in the subsystem 200 indicate routing of the message in the subsystem, with the numbers next to the dotted lines indicating the order of routing. Initially, an action such as a call initiated by a mobile subscriber (not shown) results in a corresponding message being supplied to the MSC 214. The MSC 214 receives the message and forwards the message as indicated by the line 1 to the STP 218 which, in turn, routes the message to the message-forwarding HLR 202 as indicate by the line 2. The message-forwarding HLR 202 utilizes the look-up table 204 of FIG. 4 and executes the process of FIG. 3 to determine whether to forward or process the message.

In this example, the message-forwarding HLR 202 determines the message is to be forwarded to the conventional HLR 222. Accordingly, the message-forwarding HLR 202 forwards the message to the STP 218 as indicated by the line 3 and the STP 218 thereafter routes the message to the HLR 222 as indicated by the line 4. The HLR 222 then processes the message as previously described to verify the information of the subscriber that initiated the call, and thereafter communicates directly to the subscriber. Communicating directly with the subscriber means that the message-forwarding HLR 202 is no longer involved, but instead the HLR 222 handles processing of the call as it would if the message had initially be routed to the HLR 222. The HLR 222 thus provides a return message as indicated by the line 5 to the STP 218 which, in turn, routes the message to the MSC 214 as indicated by the line 6. The MSC 214 thereafter communicates the return message to the subscriber that initiated the call.

Figure 6:
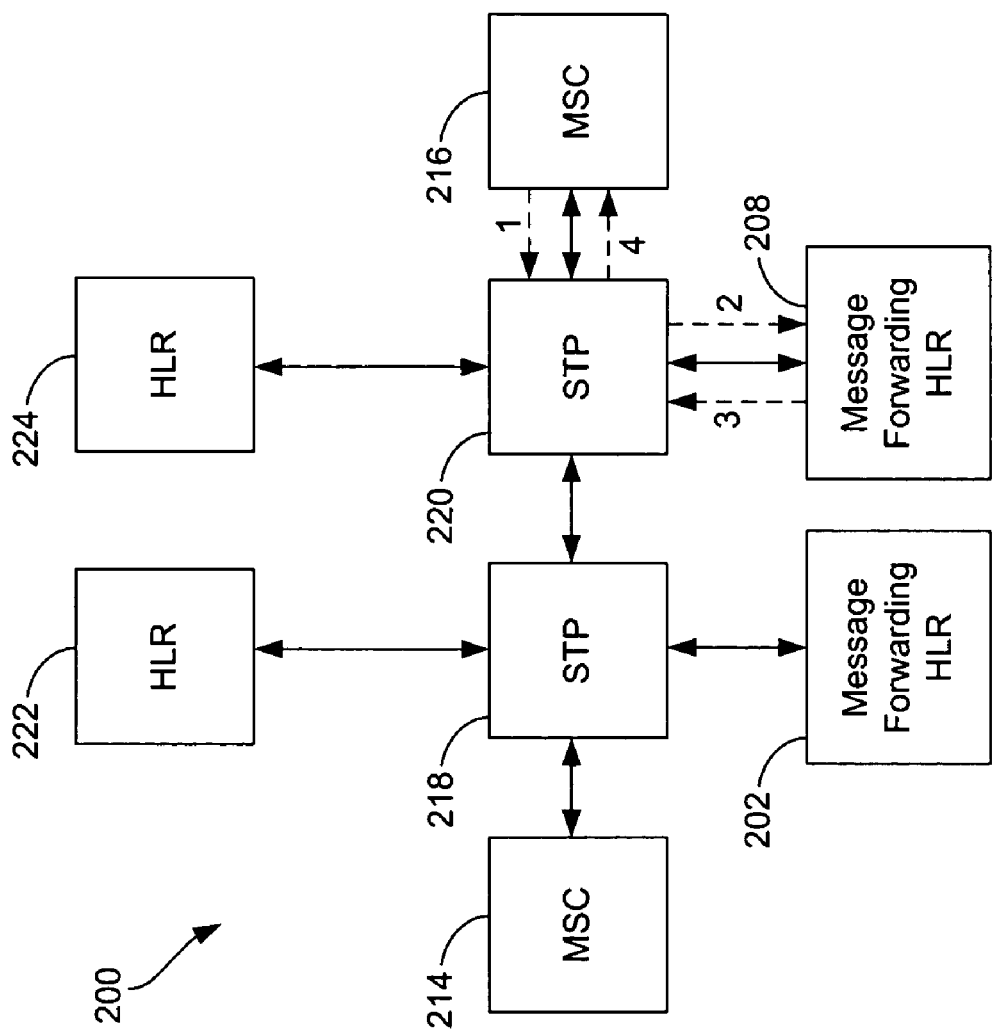
FIG. 6 is a functional block diagram of the network subsystem of FIG. 2 illustrating the routing of messages in the subsystem when the message-forwarding HLR processes a received message.

FIG. 6 is a functional block diagram of the network subsystem 200 of FIG. 2 illustrating the routing of TCAP messages in the subsystem when the message-forwarding HLR 208 processes a received message. Recall, the message-forwarding HLR 208 operates in the same way as the message-forwarding HLR 202. Initially, an action (e.g. a point-to-point call) initiated by a mobile subscriber (not shown) results in a corresponding message being supplied to the MSC 216. The MSC 216 receives the message and forwards the message as indicated by the line 1 to the STP 220 which, in turn, routes the message to the message-forwarding HLR 208 as indicated by the line 2. The message-forwarding HLR 208 utilizes the look-up table 204 of FIG. 4 and executes the process of FIG. 3 to determine whether to forward or process the message.

In this example, the message-forwarding HLR 208 determines the message is to be processed and, accordingly, the message-forwarding HLR processes the message as previously described to verify the information of the subscriber that initiated the call. The message-forwarding HLR 208 thereafter communicates a return message to the STP 220 as indicated by the line 3. The STP 220 routes the return message to the MSC 216 as indicated by the line 4, and the MSC thereafter communicates the return message to the subscriber that initiated the action (e.g. point-to-point-call).

One skilled in the art will understand that even though various embodiments and advantages of the present invention have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate, may be realized through software executing on suitable processing circuitry. It should also be noted that the functions performed by the components 200-224 can be combined to be performed by fewer elements or divided and performed by more elements depending upon the implementation of the subsystem 200. Therefore, the present invention is to be limited only by the appended claims.

What is claimed is:

1. A message-forwarding system, comprising:
   a look-up table having a plurality of records, each record including an action indicator; and
   a message-forwarding home location register (MFHLR) configured to verify registration and authentication information of a subscriber,
   wherein the MFHLR is configured to receive a message initiated by the subscriber of the MFHLR and containing subscriber identification information of the subscriber,
   wherein the MFHLR is operable to determine from the subscriber identification information in the message whether to process the verification of the registration and authentication information of the subscriber locally at the MFHLR, and is further operable to determine whether to forward the message to another home location register (HLR) to perform the verification instead of processing the verification locally, and
   wherein the determination as to whether to forward the message to the another HLR for verification or process the verification locally includes determining whether the subscriber identification information of the message matches a record of the plurality of records in the look-up table and, in response to finding a matching record, determining whether the action indicator of the matching record indicates that the matching message is to be forwarded by the message-forwarding home location register to another HLR or to be processed locally in the message-forwarding home location register, and, in response to a completion of the verification locally or at the another HLR, communicating the verification to a switching center to allow the switching center to route the message to a second subscriber.

2. The message-forwarding system according to claim 1 wherein the message comprises a TCAP message.

3. The message-forwarding system according to claim 1, wherein the message-forwarding home location register is further configured to, in response to determining that the message includes an IMSI identifier, determine to use an MSISDN identifier in searching the plurality of records for a matching record as a part of determination as to whether to forward the message or process the message.

4. The message-forwarding system according to claim 1 wherein the message includes at least one of an IMSI identifier and a MSISDN identifier, and wherein the determination by the message-forwarding home location register is performed using at least one of the IMSI and the MSISDN identifier.

5. The message-forwarding system according to claim 1, further comprising:
   a database located at the MFHLR, the MFHLR operable to provide the message to the database upon a determination by the message-forwarding home location register that the verification of the registration and authentication information of the subscriber is to be processed locally.

6. A telecommunications network, comprising:
   a message-forwarding component configured to verify registration and authentication information of a subscriber, the message-forwarding component including a local logic component and a look-up table of a plurality of records and configured to receive messages, each message initiated by the subscriber including subscriber identification information,
   wherein the message-forwarding component is operable to determine whether to process the verification of the registration and authentication information of the subscriber locally at the local logic component, or to forward the message to another logic component to perform the verification instead of processing the verification locally, and
   wherein, in response to a completion of the verification locally or at the another logic component, the message-forwarding component communicates the verification to a mobile switching center component to allow the mobile switching center component to route the message to another subscriber;
   wherein each of the plurality of records includes an action indicator and the determination as to whether to forward each message or process the message includes determining whether the subscriber identification information of the message matches a record of the plurality of records and, in response to finding the matching record, determining whether the action indicator of the matching record indicates that the matching message is to be forwarded by the message-forwarding component or to be processed in the message-forwarding component.

7. The telecommunications network according to claim 6, further comprising:
   at least one signal transfer point component, the at least one signal transfer point being coupled to the mobile switching center component and the message-forwarding component and being operable to transfer messages.

8. The telecommunications network according to claim 6 wherein each message comprises a TCAP message.

9. The telecommunications network according to claim 6 wherein the message-forwarding component is further configured to, in response to determining that one of the messages includes an IMSI identifier, determine to use an MSISDN identifier in searching the plurality of records as a part of making the determination as to whether to forward the message to another logic component or process the verification locally.

10. The telecommunications network according to claim 6 wherein each message includes at least one of an IMSI identifier and a MSISDN identifier, and
the determination by the message-forwarding component is performed using the at least one of the IMSI and the MSISDN identifier.

11. The telecommunications network according to claim 6, wherein the telecommunications network is a GSM network, wherein the GSM network further includes STP and MSC components communicated with the message-forwarding component.

12. A method of processing messages in a telecommunications network, the method comprising:
receiving a message in a first home location register (HLR), the message initiated by a subscriber of the first HLR and including subscriber identification information, wherein the first HLR verifies registration and authentication information of the subscriber;
determining from the subscriber identification information whether to process the verification of the registration and authentication information of the subscriber locally at the first HLR or forward the message to a second HLR for performing the verification instead of processing the verification locally, wherein the determination as to whether to forward the message to the second HLR or process the message locally at the first HLR includes determining whether the subscriber identification information of the message matches a record of the plurality of records in a look-up table, each of the plurality of records including an action indicator, and, in response to finding a matching record, determining whether the action indicator of the matching record indicates that the matching message is to be forwarded by the first HLR to the second HLR or to be processed in the first HLR;
processing the verification locally at the first HLR if the determination from the subscriber information is to process the message;
forwarding the message to the second HLR instead of processing the verification locally if the determination from the subscriber information is to forward the message; and
in response to a completion of the verification locally or at the second HLR, communicating the verification to a mobile switching center to allow the mobile switching center to route the message to another subscriber.

13. The method according to claim 12 wherein determining from the subscriber identification information whether to process or forward the message comprises, in response to determining that the message includes an IMSI identifier, determining to use an MSISDN identifier in searching the plurality of records as a part of the determination as to whether to forward the message or process the message.

14. The method according to claim 12 wherein the subscriber identification information in each message includes at least one of an IMSI identifier and a MSISDN identifier, and wherein the method further comprises comparing the at least one of the IMSI identifier and the MSISDN identifier with identification information contained in each record in the look-up table.

15. The method according to claim 14 wherein each record in the look-up table comprises at least one subscriber identification field;
wherein each record further comprises translation data fields containing information about whether to forward the message to the second HLR instead of processing the message locally and about whether to process the message locally, and a network address for the second HLR to forward the message;
wherein determining comprises comparing the subscriber identification field in the look-up table to the subscriber identification information associated with the message; and
wherein forwarding the message comprises forwarding the message to the network address when the subscriber identification information in the message matches the information in the at least one subscriber identification field.

16. A computer program product embodied on one or more computer readable data storage mediums for forwarding and processing telecommunications messages, the computer program product comprising instructions that, when executed by a processor, perform a method comprising:
receiving a message in a first home location register (HLR), the message initiated by a subscriber of the first HLR and including subscriber identification information, wherein the first HLR verifies registration and authentication information of the subscriber; and
determining from the subscriber identification information whether to process the verification of the registration and authentication information of the subscriber locally at the first HLR or forward the message to a second HLR for performing the verification instead of processing the verification locally,
wherein the determination as to whether to forward the message to the second HLR or process the message locally at the first HLR includes determining whether the subscriber identification information of the message matches a record of the plurality of records in a look-up table, each of the plurality of records including an action indicator, and, in response to finding a matching record, determining whether the action indicator of the matching record indicates that the matching message is to be forwarded by the first HLR to the second HLR or to be processed in the first HLR; and
in response to a completion of the verification locally at the first HLR or at the second HLR, communicating the verification to a mobile switching center to allow the mobile switching center to route the message to another subscriber;
wherein each record includes,
at least one subscriber identification field indicating a type of subscriber identification information to be compared and a subscriber identification address indicating a value for the subscriber identification information;
the action indicator; and
a network address of the second HLR for forwarding the message to the second HLR.

17. The computer program product of claim 16 wherein each record of the look-up table further comprises:
at least one forward component number field containing information about the first home location register.

18. The computer program product according to claim 16 wherein the data structure is adapted to be applied to TCAP messages.

19. The computer program product of claim 17 wherein each record of the look-up table further comprises:
- a single subscriber identification field indicating the type of subscriber identification information to be compared;
- three subscriber identification value fields each indicating a corresponding value, the three fields being,
  - a nature of address field,
  - a number plan field, and
  - an address field;
- two translation data fields,
- the action indicator field containing a value to forward the corresponding message instead of processing the corresponding message or a value to process the corresponding message, and
- a network entity field containing the network address for the second home location register to forward the corresponding message as indicated by the value in the corresponding action indicator field; and
- three forward component number fields,
  - a nature of address field,
  - a number plan field, and
  - an address field.

20. The computer program product according to claim 19 wherein the subscriber identification field comprises one of an IMSI identifier and an MSISDN identifier.

21. A computer-readable medium whose contents cause a computer to process messages in a telecommunications network by performing the operations of:
- receiving a message in a first home location register (HLR), the message initiated by a subscriber of the first HLR and including subscriber identification information, wherein the first HLR verifies registration and authentication information of the subscriber;
- determining from the subscriber identification information whether to process the verification of the registration and authentication information of the subscriber locally at the first HLR or forward the message to a second HLR for performing the verification instead of processing the verification locally, wherein the determination as to whether to forward the message to the second HLR or process the message locally at the first HLR includes determining whether the subscriber identification information of the message matches a record of the plurality of records in a look-up table, each of the plurality of records including an action indicator, and, in response to finding a matching record, determining whether the action indicator of the matching record indicates that the matching message is to be forwarded by the first HLR to the second HLR or to be processed in the first HLR;
- processing the verification locally at the first HLR if the determination from the subscriber information is to process the message;
- forwarding the message to the second HLR instead of processing the verification locally if the determination from the subscriber information is to forward the message; and
- in response to a completion of the verification locally or at the second HLR, communicating the verification to a mobile switching center to allow the mobile switching center to route the message to another subscriber.

22. The computer-readable medium according to claim 21 wherein determining from the subscriber identification information whether to process or forward the message comprises, in response to determining that the message includes an IMSI identifier, determining to use an MSISDN identifier in searching the plurality of records as a part of making the determination as to whether to forward the message or process the message.

* * * * *